United States Patent [19]

Ito et al.

[11] Patent Number: 4,663,670
[45] Date of Patent: May 5, 1987

[54] TELEVISION RECEIVER HAVING A LIQUID CRYSTAL DISPLAY DEVICE

[75] Inventors: Katsu Ito; Munehiro Shinabe; Akira Miyajima; Nobuyuki Hashimoto; Hideshi Ohno; Akira Tsuzuki; Shigeru Morokawa; Minoru Natori, all of Tokorozawa, Japan

[73] Assignee: Citizen Watch Co., Ltd., Tokyo, Japan

[21] Appl. No.: 680,534

[22] Filed: Dec. 11, 1984

[30] Foreign Application Priority Data

Dec. 15, 1983 [JP] Japan .................... 58-236725

[51] Int. Cl.⁴ ............................................. H04N 5/65
[52] U.S. Cl. .................... 358/245; 358/236; 358/254
[58] Field of Search ........... 358/236, 254, 253, 255, 358/245, 252; 455/300, 301; 350/334, 331 R

[56] References Cited

U.S. PATENT DOCUMENTS

| | | | |
|---|---|---|---|
| 2,362,034 | 11/1944 | Stahl | 455/300 X |
| 3,387,214 | 6/1968 | Meyer | 455/301 |
| 3,679,829 | 7/1972 | Hofmeister et al. | 455/300 X |
| 3,783,191 | 1/1974 | Sugimoto et al. | 358/225 |
| 4,246,613 | 1/1981 | Choder et al. | 358/253 X |
| 4,381,421 | 4/1983 | Coats et al. | 358/245 X |
| 4,412,255 | 10/1983 | Kuhlman et al. | 358/245 |
| 4,468,702 | 8/1984 | Jandrell | 358/245 |
| 4,542,026 | 9/1985 | Bednazz et al. | 455/300 X |

FOREIGN PATENT DOCUMENTS 0041061 3/1980 Japan .................... 358/254

OTHER PUBLICATIONS

"Electronic Liquid Window" Marks, pp. 31-35, 106; Apr. '69.

Primary Examiner—Howard W. Britton
Assistant Examiner—Victor R. Kostak
Attorney, Agent, or Firm—Birch, Stewart, Kolasch & Birch

[57] ABSTRACT

A television receiver having a liquid crystal display device includes a receiver having a electromagnetically shielded case and a receiving circuit provided in the shielded case and electrically connected to an antenna for producing audio signals and video signals. A liquid crystal display panel of the liquid crystal display device is electromagnetically shielded by a transparent and conductive shielding film for shielding the liquid crystal display panel.

12 Claims, 3 Drawing Figures

4,663,670

TELEVISION RECEIVER HAVING A LIQUID CRYSTAL DISPLAY DEVICE

BACKGROUND OF THE INVENTION

The present invention relates to a television receiver provided with a liquid crystal cell as a video display device.

In the television receiver, sound and picture carrier waves pass through an antenna, inducing currents. The carrier currents are converted to intermediate-frequencies and amplified by intermediate-frequency amplifiers. The intermediate-frequency signals are detected to provide an audio signal and a video signal. The video signal is fed to a liquid crystal panel driving circuit for display of a video image. The liquid crystal panel driving circuit composes liquid crystal driving waveforms from the video signal for driving the liquid crystal cell to develop half-tone images. The liquid crystal driving waveforms comprises pulses. However, a frequency band of the pulse signals is very wide to cover a range between zero Hz and several hundred MHz. Accordingly, rapid electromagnetic change by the pulse signals causes the radiation of electromagnetic waves, that is, pulse noises. The pulse noises radiated from the liquid crystal panel and panel driving circuit enter into the antenna, intermediate-frequency amplifier, video signal circuit, and audio signal circuit, causing picture quality and sound quality of the television receiver to remarkably deteriorate.

In order to prevent entering of pulse noises, the circuit of the television receiver is divided into a receiving circuit block and a liquid crystal panel driving circuit block, and both circuit blocks are shielded by surrounding the blocks by metal films, respectively. However, since the surface of the liquid crystal cell can not be shielded, pulse noises radiate from the surface. Accordingly, if the pulse noises from the liquid crystal cell enter into the antenna, the operation of the receiver circuit is greatly disturbed. Such a disturbance is liable to occur in a compact liquid crystal television receiver in which the antenna is closely disposed to the liquid crystal cell.

SUMMARY OF THE INVENTION

The object of the present invention is to eliminate the above described disadvantages of a television receiver with a liquid crystal display device.

According to the present invention, there is provided a television receiver having a liquid crystal display device, comprising a case having a shielding quality, an antenna, a receiving circuit provided in the case and electrically connected to the antenna for producing audio signals and video signals, a liquid crystal display panel, a driving circuit responsive to the video signals for driving the liquid crystal display panel, and transparent and conductive shielding means for shielding the liquid crystal display panel.

In another aspect of the present invention, the television receiver further comprises a cover glass provided on the case for covering the liquid crystal display panel, and the shielding means is provided on the cover glass.

In accordance with further aspect of the present invention, liquid crystal display panel and the driving circuit are provided in an independent frame having a shielding quality, the frame is pivotally connected to the case, the frame and shielding means for the liquid crystal display panel are electrically connected with each other and further connected to the ground of the receiving circuit by a shielded cable.

These and other objects and features of the present invention will become more apparent from the following description with reference to the accompanying drawings.

DESCRIPTION OF THE PREFERRED EMBODIMENT

Figure 1:
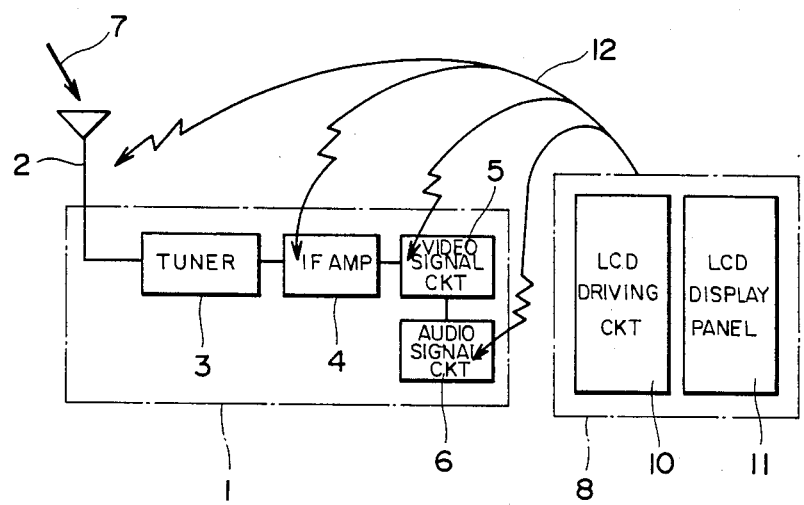
FIG. 1 is a block diagram showing a television receiver with a liquid crystal display device.

Referring to FIG. 1 showing a circuit of a liquid crystal television receiver, a receiving circuit block 1 comprises an antenna 2, tuner 3, intermediate-frequency amplifier 4, video signal circuit 5, and audio signal circuit 6. Sound and picture carrier waves 7 pass through the antenna 2, and the induced currents are amplified and detected to provide an audio signal and a video signal. The video signal is applied to a liquid crystal display panel driving circuit block 8. The driving circuit block 8 for a liquid crystal panel comprises a liquid crystal panel driving circuit 10 and a liquid crystal display panel 11. Pulse noises 12 are electromagnetically radiated from the driving circuit block 8 and enter into the receiving circuit block 1, which causes the picture and sound qualities to deteriorate.

Figure 2:
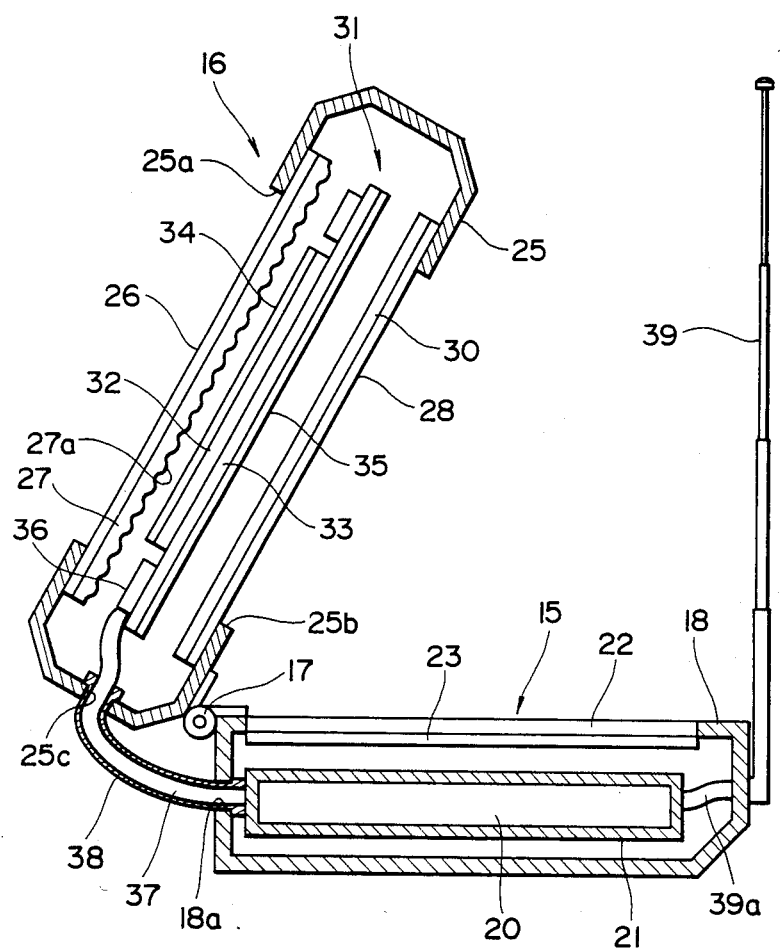
FIG. 2 is a sectional view showing a television receiver with a liquid crystal display device of a light transmission type according to the present invention.

Referring to FIG. 2, a liquid crystal television receiver according to the present invention comprises a receiving circuit block 15 and a display block 16.

The receiving circuit block 15 comprises a case 18 made of metal such as aluminum or a plastic body coated with a copper or iron thin film, a receiving circuit 20 including a tuning and intermediate-frequency amplifier provided in the case 18, and a conductive shielding plate, film or layer 21 covering the receiving circuit 20. The conductive shielding layer 21 is made of metal such as copper, aluminum, or iron. A mirror 22 is secured to an inner wall of an opening provided in the case 18 for reflecting an image passing through the display block 16. A metallic shielding layer 23 is disposed on the underside of the mirror 22 so as to shield the mirror, and is connected to the conductive shielding layer 21, at least so as to couple the metallic shielding layer 23 to the conductive shielding layer 21 to allow transmission of alternating current by connecting through a capacitance.

The display block 16 comprises a frame 25 made of metal or a plastic body coated with metal film like the case 18. The frame 25 is pivotally connected to the case 18 by a hinge 17. A transparent upper cover glass 27 the outside surface of which is coated with transparent conductive shielding layer 26 is secured to the inside wall of the upper portion of the frame 25 at a periphery of an opening 25a. The layer 26 is made of conductive indium oxide or tin oxide for providing electromagnetic shielding. The glass 27 may be made of a hard, transparent material such as polycarbonate. A waveform surface 27a is formed on the underside of the glass 27 for diffusing the light. As the transparent conductive shielding layer 26, tin oxide is preferable, because it can be easily made into a hard film, whereby a protective effect on the glass may be expected. A lower cover glass 30 coated with a transparent conductive shielding layer 28 is secured to a lower portion of the frame 25 at a periphery of an opening 25b. The glass 30 and layer 28 are made of the same materials as the upper glass 27 and layer 26.

A liquid crystal display panel 31 comprises an upper glass substrate 32 and a lower glass substrate 33, each having mosaic transparent electrodes provided on a surface thereof. A liquid crystal material of twisted nematic-mode is sealed between the substrates to form liquid crystal cells at a distance of several microns. Upper and lower polarizers 34, 35 are disposed on the substrates 32, 33 respectively at opposite sides thereof, having a difference of the right angle in polarization axis. Integrated circuits (ICs) 36 for driving the liquid crystal panel are mounted on the substrate 33.

The liquid crystal display panel driving circuit is connected to the receiving circuit 20 by a ribbon cable 37 for transmitting signals and power to the display panel. The ribbon cable 37 passes through a hole 18a formed in the case 18 and a hole 25c formed in the frame 25. A flexible shielding ribbon 38 made of thin metal film is wound on the ribbon cable 37 for preventing the radiation of pulse noises. A rod antenna 39 is attached to the case 18 and electrically connected to the receiving circuit by a shielded cable 39a.

In accordance with the present invention, conductive shielding layers 25, 26 and 28 are electrically connected each other to surround the liquid crystal display panel 31 provided with the ICs 36. Further, the frame 25, functioning as the shielding member is connected to the shielding ribbon 38 on the cable 37, which is in turn connected to the shielding layer 21 or a ground of the receiving circuit in the circuit 20 so as to at least allow passage of alternating current. Thus, the shielding layer 21 of the receiving circuit block 15, conductive shielding layers 25, 26 and 28 of the display block 16 are electrically connected through the shielding ribbon 38, so that the radiation of pulse noises can be effectively prevented.

It will be understood that shielding layers 26 and 28 may be provided on outsides of glasses 27 and 30, respectively.

Figure 3:
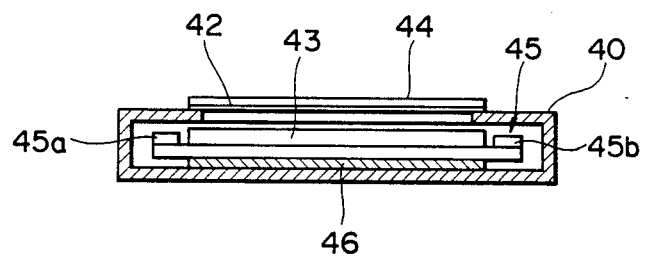
FIG. 3 is a sectional view showing another embodiment of the present invention in which a liquid crystal display device of a light reflection type is employed.

FIG. 3 shows another embodiment of the present invention. The television receiver is employed with a liquid crystal display panel of the reflection type, so that the display device is provided in a metal case 40 having a shielding effect.

The television receiver comprises a cover glass 44, the underside of which is coated with a transparent shielding electrode 42, a liquid crystal display panel 43, an integrated circuit 45 comprising a liquid crystal driving circuit 45a and a circuit 45b, and a mirror 46 disposed under the display panel 43.

Thus, the display panel 43 is covered by the shielding case 40 and transparent conductive shielding electrode 42, so that the radiation of the pulse noises can be prevented.

While the invention has been described in conjunction with preferred specific embodiments thereof, it will be understood that this description is intended to illustrate and not limit the scope of the invention, which is defined by the following claims.

What is claimed is:

1. A television receiver comprising:
    a case having an electromagnetic shielding quality and having an opening at an upper side thereof;
    an antenna;
    receiving means, provided in said case and electrically connected to the antenna, for producing audio signals and video signals;
    a liquid crystal display panel disposed adjacent to said opening;
    a reflector disposed adjacent to said panel opposite from said opening;
    driving means, responsive to the video signals, for driving the liquid crystal display panel to display said video signals; and
    transparent and conductive shielding means for electromagnetically shielding a surface of the liquid crystal display panel so as to prevent radiation of pulse noise from said liquid crystal display panel.

2. The television receiver according to claim 1 further comprising a cover glass provided to cover the surface of said liquid crystal display panel, and said transparent and conductive shielding means is provided on the underside of the cover glass.

3. The television receiver according to claim 1 wherein said transparent and conductive shielding means is formed of indium oxide.

4. The television receiver according to claim 1 wherein said transparent and conductive shielding means is formed of tin oxide.

5. A television receiver comprising:
    a case;
    an antenna mounted on said case;
    receiving means, provided in said case and electrically connected to said antenna, for producing audio and video signals;
    a liquid crystal display panel;
    driving means, responsive to said video signals, for driving said liquid crystal display panel with said video signals; and
    shield means for electromagnetically shielding said antenna and receiving means from pulse noise developed by said liquid crystal display panel, said shield means including a transparent conductive layer formed over said liquid crystal display panel.

6. The television receiver of claim 5 wherein said transparent conductive layer is formed of indium oxide.

7. The television receiver of claim 5 wherein said shield means includes said case, said case being electrically conductive.

8. The television receiver of claim 7 wherein said case is electrically connected to said transparent conductive layer.

9. The television receiver of claim 5 wherein said case is formed of a non-conductive material, said shield means including a conductive case layer formed over said case.

10. The television receiver of claim 9 wherein said conductive case layer and said transparent conductive layer are electrically connected.

11. The television receiver of claim 5 wherein said case includes a first portion containing said receiving means and a second portion containing said liquid crystal display panel and said driving means.

12. The television receiver of claim 11 wherein said shield means includes a conductive case layer on each said case portion.

* * * * *